United States Patent [19]

Hanson et al.

[11] 4,258,412
[45] Mar. 24, 1981

[54] FLASH LAMP ARRAY HAVING IMPROVED REFLECTOR AND BARRIER MEMBER

[75] Inventors: James M. Hanson, Euclid; Juliana Pinkasovich, S. Euclid; Vaughn C. Sterling, Cleveland Heights, all of Ohio

[73] Assignee: General Electric Company, Schenectady, N.Y.

[21] Appl. No.: 41,934

[22] Filed: May 23, 1979

[51] Int. Cl.³ .............................................. G03B 15/02
[52] U.S. Cl. ......................................... 362/10; 362/13
[58] Field of Search ...................... 362/10, 11, 13, 240

[56] References Cited

U.S. PATENT DOCUMENTS 4,152,751  5/1979  Sindlinger ............................. 362/13

Primary Examiner—Stephen J. Lechert, Jr.
Attorney, Agent, or Firm—John F. McDevitt; Lawrence R. Kempton; Philip L. Schlamp

[57] ABSTRACT

A planar-type multiple photoflash array is disclosed and including a circuit board with circuitry thereon for sequentially firing a plurality of flash lamps which are positioned horizontally in the cavities of an integral reflector and barrier member supported on said circuit board. The present improvement comprises further including spacing means between the contact and surfaces of the circuit board and barrier member to reduce the amount of radiant energy being transmitted by the flash lamps to radiant energy actuated switches and the circuitry of the circuit board member.

9 Claims, 2 Drawing Figures

FLASH LAMP ARRAY HAVING IMPROVED REFLECTOR AND BARRIER MEMBER

BACKGROUND OF THE INVENTION

A multilamp photoflash array of the all-glass lamp type and having the same general configuration used herein is disclosed in U.S. Pat. No. 4,133,023, said patent being assigned to the assignee of the present invention. Said flash lamp array also includes a reflector and barrier member of a one-piece construction, preferably of molded white plastic interspersed with titanium dioxide, shaped to provide the reflector cavities for the plurality of flash lamps positioned therein. The barrier portions of said one-piece member prevents sympathetic flashing by which a lamp adjacent to a flashing lamp could be caused to flash due to heat and/or light radiating from the flash lamp. Said one-piece member further includes aperture openings which permit radiant energy passing from the flashing lamps to switch devices below which form part of the circuitry for sequential firing of the flash lamps connected in the circuitry. A serious problem which has been encountered in the operation of this type flash lamp array now occurs when the underlying switch devices undergo overly vigorous conversion from a high electrical resistant state ("off" condition) to a low electrical resistance state ("on" condition) which frequently causes the converted switches to blow off the circuit board member. Removal of switch devices in this manner produces an open circuit condition in the electrical circuitry thereby interrupting the electrical circuit path and preventing further unflashed lamps in the circuitry to be flashed. The problem has also become more severe with employment of higher intensity flash lamps than have previously been employed.

It would be desirable, therefore, to provide a more reliable switch operation in this type flash lamp array without further necessitating a significant departure in the present construction of said array.

SUMMARY OF THE INVENTION

It has now been discovered that a more reliable switch conversion from the high electrical resistance condition to the low electrical resistance condition can be effected in the aforementioned type flash lamp array by incorporating spacer means between the contacting surfaces of the circuit board and the barrier members which reduces the amount of radiant energy being transmitted by the flash lamps to the underlying switch devices. The further spacing apart of the flash lamps from the underlying switch devices reduces the amount of radiant energy being transmitted by the flash lamps and the spacer means can be formed as an integral part of the aforementioned reflector barrier member being supported on the circuit board surface. In a preferred embodiment, the reflector and barrier member is a formed organic polymer sheet and the spacer means comprises protuberances formed on the contacting surface of said polymer sheet to provide approximately 0.020 inch spacing therebetween. Location of said protuberances on the otherwise abutting surface of the reflector and barrier member can be important since the preferred polymer material of construction is a thermoplastic type polymer which softens readily when heated. To prevent melting of said protuberances with accompanying loss of the desired spaced-apart relationship between said barrier member and the circuit board, the protuberances are located remotely from the central portion of the flash lamps mounted on said barrier member. The present spacer means also serves to reduce the thickness of the underlying switch devices from the thicknesses currently employed to insure that at least part of the converted switching material remains in place to provide a continuous circuit path in the associated circuitry. Specifically, switch thicknesses have been reduced by as much as half through utilization of the present improvement without impairment of the switch operation which is a surprising discovery.

A still further benefit attributable to spacing apart of the circuit board and barrier members and thereby providing an air gap therebetween is reduced heat distortion and melting especiallly for barrier members formed with thermoplastic polymer sheet. The cooling effect produced by incorporating spacer means between the contacting surfaces of said circuit board and barrier members effectively precludes lifting off of the switch devices and electrical circuitry deposited on the circuit board member as well as permits lower melting polymers to be employed for the barrier member and in thinner cross section than might otherwise deform. Accordingly, the present invention in its broadest usefulness serves to reduce both the heat and light forms of radiant energy being emitted from the flashing lamps to the underlying circuit board.

BRIEF DESCRIPTION OF THE DRAWINGS

The present improvement is more clearly understood from the following description taken in conjunction with the accompanying drawings in which.

DESCRIPTION OF THE PREFERRED EMBODIMENTS

Figure 1:
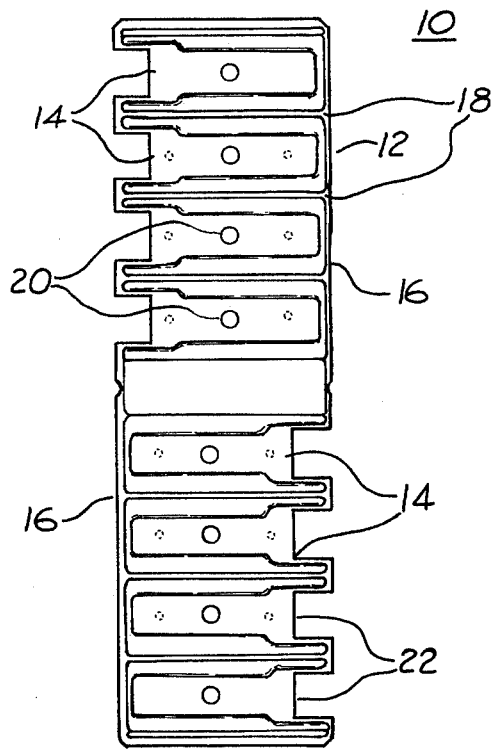
FIG. 1 is a top view of an electrical reflector and barrier member made in accordance with the present invention.

Referring to FIG. 1, there is shown the reflector and barrier member 10 which is a molded thermoplastic sheet 12 preferably of a thermoplastic high impact styrene having incorporated therein titanium dioxide particulates and shaped to provide reflector cavities 14 which position the flash lamps (not shown) horizontally with respect to a circuit board member (also not shown) that abuts with the underside of said barrier member. Reflector cavities 14 are formed with a planar side portion 16 and tapered side portions 18 of the molded member 10 and with said tapered side portions 18 forming barriers between adjacent flash lamps for preventing sympathetic flashing by which a lamp adjacent to a flashing lamp could be caused to flash due to the heat and flash or light radiation from the flashing lamp. Each reflector cavity has an aperture opening 20 which is aligned with the central portion of the flash lamp positioned therein for passage of radiant energy from the flash lamp to a radiant energy activated switch device located below on the underlying conventional circuit board member. Since the switch device and the circuitry on said circuit board member which enables sequential firing of a group of flash lamps operatively associated therewith is already well-known and described in detail in the aforementioned U.S. Pat. No. 4,133,023, further description need not be repeated in the present specification. It need only be said in connection therewith that indent portions 22 of reflector cavities 14 enable the pair of lead-in wires emerging from each flash lamp to be electrically connected in a conventional manner such as by soldering or crimping to the circuitry located on the facing surface of the circuit board supporting said barrier member.

Figure 2:
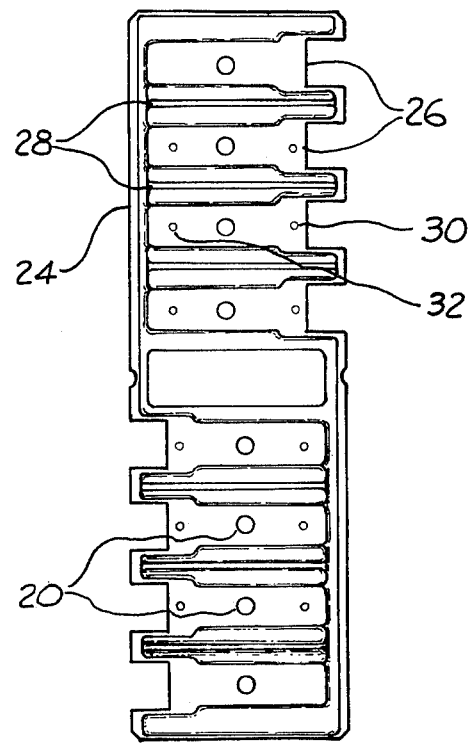
FIG. 2 depicts the modified bottom side or underside of the member shown in FIG. 1.

FIG. 2 depicts the bottom surface or underside face 24 of said barrier member 10 described in FIG. 1. Accordingly, said underside surface includes a series of flat portions 26 which engage cavity portions 28 to form the reflector cavities located on the opposite side of said molded plastic sheet. A pair of protuberances 30 and 32 extend outwardly from each flat base portion 26 to provide spacer means between the underside surface of the barrier member and the abutting surface of the underlying circuit board member. As can also be noted from said drawing, said protuberance spacer means are remotely located from the aperture openings 20 in the barrier member and adjacent to the tip end or press seal end of the flash lamps located in each reflector cavity to minimize melting of said protuberances when the lamps are flashed.

It will be apparent from the foregoing description that various modifications may be made in the above preferred integral reflector and barrier member without departing from the true spirit and scope of the present invention. For example, additional aperture openings may be included in the reflector cavity to permit additional radiant energy passage when the flash lamps are flashed to actuate associated color indicia means already being employed in this type planar type flash lamp array. It is intended to limit the present invention, therefore, only by the scope of the following claims.

What we claim as new and desire to secure by Letters Patent of the United States is:

1. In a planar type multiple photoflash array utilizing a circuit board with circuitry for sequentially firing a plurality of flash lamps connected thereto which further includes radiiant energy activated switch devices in said circuitry and with said flash lamps being positioned horizontallly in cavities of an integral reflector and barrier member supported on said circuit board by the surface having said circuitry, the improvement which comprises further including spacer means between the contacting surfaces of said circuit board and barrier member to reduce the amount of radiant energy being transmitted by the flash lamps to the radiant energy activated switch devices on the underlying circuit board.

2. A photoflash array as in claim 1 wherein the circuitry for sequentially firing the flash lamps includes radiant energy activated switch devices and the visible light being transmitted by the flash lamps thereto is reduced.

3. A photoflash array as in claim 2 wherein the heat energy being transmitted by the flash lamps to the underlying circuit board is reduced.

4. A photoflash array as in claim 1 wherein the reflector and barrier member is a formed thermoplastic polymer sheet.

5. A photoflash array as in claim 4 wherein the spacer means comprises protuberances formed on the contacting surface of said polymer sheet.

6. A photoflash array as in claim 1 wherein the reflector and barrier member permits radiant energy passage to the switch devices in the circuitry of the circuit board through aperture openings.

7. A photoflash array as in claim 6 wherein the spacer means are remotely located from the aperture openings.

8. In a planar type multiple photoflash array utilizing a circuit board with circuitry for sequentially firing a plurality of flash lamps connected thereto which further includes radiant energy activated switch devices in said circuitry and with said flash lamps being positioned horizontally in cavities of an integral reflector and barrier member in the form of an organic polymer sheet supported on said circuit board by the surface having said circuitry, the improvement which comprises further including aperture openings in said polymer sheet to permit radiant energy passage from said flash lamps to said radiant energy activated switch devices in the circuitry of said circuit board in combination with protuberances being formed on the contacting surface of said polymer sheet and remotely located from the aperture openings to serve as spacer means reducing the amount of radiant energy being transmitted to said switch devices.

9. A photoflash array as in claim 8 wherein the heat energy being transmitted by said flash lamp to the underlying circuit board is reduced.

* * * * *